(12) United States Patent
Yoo

(10) Patent No.: US 9,306,908 B2
(45) Date of Patent: Apr. 5, 2016

(54) ANTI-MALWARE SYSTEM, METHOD OF PROCESSING PACKET IN THE SAME, AND COMPUTING DEVICE

(71) Applicant: SAMSUNG SDS CO., LTD., Seoul (KR)

(72) Inventor: In Seon Yoo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 124 days.

(21) Appl. No.: 14/083,776

(22) Filed: Nov. 19, 2013

(65) Prior Publication Data

US 2014/0201828 A1 Jul. 17, 2014

Related U.S. Application Data

(60) Provisional application No. 61/727,917, filed on Nov. 19, 2012.

(51) Int. Cl.
*H04L 29/06* (2006.01)
*G06F 21/56* (2013.01)

(52) U.S. Cl.
CPC .......... *H04L 63/0227* (2013.01); *G06F 21/566* (2013.01); *G06F 21/567* (2013.01)

(58) Field of Classification Search
CPC .. H04L 63/0227; G06F 21/566; G06F 21/567
USPC .................... 726/1, 3, 6, 11, 13, 22
See application file for complete search history.

(56) References Cited

U.S. PATENT DOCUMENTS

| | | | | |
|---|---|---|---|---|
| 5,864,666 A * | 1/1999 | Shrader | .................... | H04L 41/22 709/229 |
| 6,009,475 A * | 12/1999 | Shrader | ............... | H04L 63/0263 709/217 |
| 6,173,364 B1 * | 1/2001 | Zenchelsky | ......... | H04L 63/0254 711/118 |
| 6,496,935 B1 * | 12/2002 | Fink | ..................... | H04L 63/0254 370/451 |
| 6,510,509 B1 * | 1/2003 | Chopra | .................... | H04L 29/06 709/236 |
| 6,701,432 B1 * | 3/2004 | Deng | ..................... | H04L 29/06 713/153 |
| 6,738,779 B1 * | 5/2004 | Shapira | ............. | G06F 17/30949 707/747 |
| 6,772,223 B1 * | 8/2004 | Corl, Jr. | .................. | H04L 29/06 709/220 |
| 6,778,984 B1 * | 8/2004 | Lu | .......................... | H04L 47/10 |
| 7,152,240 B1 * | 12/2006 | Green | ..................... | H04L 63/02 706/60 |
| 7,215,637 B1 * | 5/2007 | Ferguson | ................ | H04L 45/00 370/230.1 |
| 7,225,188 B1 * | 5/2007 | Gai | .................... | G06F 17/30982 |

(Continued)

FOREIGN PATENT DOCUMENTS

| | | |
|---|---|---|
| KR | 1020030077292 | 10/2003 |
| KR | 1020050085015 | 8/2005 |
| KR | 100750377 | 8/2007 |
| KR | 1020100112254 | 10/2010 |
| KR | 1020110032732 | 3/2011 |

OTHER PUBLICATIONS

Communication issued on Apr. 8, 2015 by the Korean Intellectual Property Office in related Application No. 1020130139278.
Communication issued on Apr. 17, 2015 by the Korean Intellectual Property Office in related Application No. 1020130139280.

*Primary Examiner* — David García Cervetti
(74) *Attorney, Agent, or Firm* — Sughrue Mion, PLLC

(57) ABSTRACT

An anti-malware (AM) apparatus includes: a hardware-based firewall (FW) engine, including a packet matching engine configured to perform matching of a packet with a plurality of FW rules, and to generate a matching results; and an FW function module configured to determine an action for filtering the packet on the basis of the matching result.

25 Claims, 11 Drawing Sheets

(56) References Cited

U.S. PATENT DOCUMENTS

| | | | | |
|---|---|---|---|---|
| 7,398,553 | B1* | 7/2008 | Li | G06F 21/566 713/189 |
| 7,454,418 | B1* | 11/2008 | Wang | G06F 21/564 |
| 7,577,758 | B2* | 8/2009 | Ricciulli | H04L 47/2441 370/245 |
| 7,735,116 | B1* | 6/2010 | Gauvin | G06F 21/552 713/153 |
| 7,894,480 | B1* | 2/2011 | Wang | H04L 63/0263 370/392 |
| 7,945,528 | B2* | 5/2011 | Cytron | G06F 17/30985 706/62 |
| 7,966,654 | B2* | 6/2011 | Crawford | H04L 63/0236 726/1 |
| 8,051,085 | B1* | 11/2011 | Srinivasan | H04L 63/0245 707/737 |
| 8,250,016 | B2* | 8/2012 | Hua | G06K 9/62 706/45 |
| 8,458,354 | B2* | 6/2013 | Bremler-Barr | H03M 7/3086 709/231 |
| 8,504,510 | B2* | 8/2013 | Bremler-Barr | G06N 5/003 706/48 |
| 8,800,021 | B1* | 8/2014 | Swaminathan | H04L 63/0209 726/11 |
| 2002/0126672 | A1* | 9/2002 | Chow | H04L 29/06 370/392 |
| 2003/0156586 | A1* | 8/2003 | Lee | H04L 69/22 370/392 |
| 2003/0161272 | A1* | 8/2003 | Teplitsky | H04L 45/7457 370/252 |
| 2003/0188192 | A1* | 10/2003 | Tang | H04L 63/0263 726/13 |
| 2003/0212900 | A1* | 11/2003 | Liu | H04L 63/101 726/13 |
| 2003/0217046 | A1* | 11/2003 | Yuan | G06F 17/30955 |
| 2003/0221013 | A1* | 11/2003 | Lockwood | H04L 41/08 709/231 |
| 2003/0226027 | A1* | 12/2003 | Marquet | H04L 63/0263 726/11 |
| 2004/0039940 | A1* | 2/2004 | Cox | H04L 29/06 709/224 |
| 2004/0100972 | A1* | 5/2004 | Lumb | H04L 63/0227 370/401 |
| 2004/0128554 | A1* | 7/2004 | Maher, III | H04L 29/12471 726/11 |
| 2004/0172557 | A1* | 9/2004 | Nakae | H04L 63/0227 726/22 |
| 2005/0108434 | A1* | 5/2005 | Witchey | H04L 69/08 709/246 |
| 2005/0108518 | A1* | 5/2005 | Pandya | H04L 63/0485 713/151 |
| 2005/0187916 | A1* | 8/2005 | Levin | G06F 7/02 |
| 2005/0204402 | A1* | 9/2005 | Turley | H04L 63/0263 726/11 |
| 2005/0229246 | A1* | 10/2005 | Rajagopal | H04L 63/0236 726/14 |
| 2006/0136570 | A1* | 6/2006 | Pandya | G06F 17/30985 709/217 |
| 2006/0195896 | A1* | 8/2006 | Fulp | H04L 63/0263 726/11 |
| 2006/0218280 | A1* | 9/2006 | Gouda | H04L 63/0263 709/226 |
| 2006/0248580 | A1* | 11/2006 | Fulp | H04L 63/20 726/11 |
| 2007/0033641 | A1* | 2/2007 | Chu | H04L 63/1408 726/6 |
| 2007/0168377 | A1* | 7/2007 | Zabarsky | H04L 45/00 |
| 2007/0180513 | A1* | 8/2007 | Raz | H04L 29/12481 726/12 |
| 2007/0192863 | A1* | 8/2007 | Kapoor | G06F 9/505 726/23 |
| 2007/0294754 | A1* | 12/2007 | Finkelstein | H04L 63/0227 726/11 |
| 2008/0005795 | A1* | 1/2008 | Acharya | H04L 63/0263 726/23 |
| 2008/0028097 | A1* | 1/2008 | Makela | H04L 63/0254 709/237 |
| 2008/0201772 | A1* | 8/2008 | Mondaeev | H04L 63/1408 726/13 |
| 2008/0235755 | A1* | 9/2008 | Blaisdell | H04L 63/102 726/1 |
| 2009/0030895 | A1* | 1/2009 | Eswaran | G06F 17/30982 |
| 2009/0150996 | A1* | 6/2009 | Haswell | H04L 63/0245 726/22 |
| 2010/0037311 | A1* | 2/2010 | He | H04L 63/0209 726/15 |
| 2010/0169401 | A1* | 7/2010 | Gopal | G06F 7/02 708/316 |
| 2010/0322252 | A1* | 12/2010 | Suganthi | H04L 29/12339 370/395.53 |
| 2010/0322265 | A1* | 12/2010 | Gopinath | H04L 49/901 370/417 |
| 2010/0325357 | A1* | 12/2010 | Reddy | G06F 21/53 711/118 |
| 2010/0333165 | A1* | 12/2010 | Basak | H04L 63/0263 726/1 |
| 2011/0002346 | A1* | 1/2011 | Wu | H04L 67/2804 370/474 |
| 2011/0004698 | A1* | 1/2011 | Wu | G06F 9/45558 709/235 |
| 2011/0004876 | A1* | 1/2011 | Wu | H04L 12/4625 718/1 |
| 2011/0004877 | A1* | 1/2011 | Wu | G06F 9/445 718/1 |
| 2011/0131654 | A1* | 6/2011 | Taneja | H04L 63/1416 726/23 |
| 2011/0153822 | A1* | 6/2011 | Rajan | G06F 9/5055 709/225 |
| 2011/0153831 | A1* | 6/2011 | Mutnuru | H04L 29/12066 709/226 |
| 2011/0154461 | A1* | 6/2011 | Anderson | H04L 63/0227 726/7 |
| 2011/0154473 | A1* | 6/2011 | Anderson | G06F 21/64 726/11 |
| 2011/0154488 | A1* | 6/2011 | Rajan | H04L 63/123 726/22 |
| 2011/0162060 | A1* | 6/2011 | Vijayakumar | H04L 12/413 726/13 |
| 2011/0231510 | A1* | 9/2011 | Korsunsky | G06F 21/55 709/213 |
| 2011/0231564 | A1* | 9/2011 | Korsunsky | G06F 21/55 709/231 |
| 2011/0238792 | A1* | 9/2011 | Phillips | G06F 15/177 709/220 |
| 2011/0238855 | A1* | 9/2011 | Korsunsky | G06F 21/55 709/231 |
| 2011/0302648 | A1* | 12/2011 | Yoo | G06F 21/554 726/13 |
| 2011/0314547 | A1* | 12/2011 | Yoo | G06F 21/55 726/24 |
| 2011/0320617 | A1* | 12/2011 | Annamalaisami | H04L 63/1458 709/228 |
| 2012/0240215 | A1* | 9/2012 | Yoo | H04L 63/0263 726/13 |
| 2012/0254210 | A1* | 10/2012 | Dhulipala | G06F 17/30985 707/758 |
| 2012/0317276 | A1* | 12/2012 | Muniraju | H04L 41/14 709/224 |
| 2013/0007239 | A1* | 1/2013 | Agarwal | H04L 63/02 709/223 |
| 2013/0041934 | A1* | 2/2013 | Annamalaisami | H04L 43/026 709/203 |
| 2013/0061313 | A1* | 3/2013 | Cullimore | H04L 63/0227 726/13 |
| 2013/0080638 | A1* | 3/2013 | Di Benedetto | H04L 47/70 709/226 |
| 2013/0125230 | A1* | 5/2013 | Koponen | H04L 41/0823 726/13 |
| 2013/0173647 | A1* | 7/2013 | Ro | G06F 7/02 707/758 |

(56) References Cited

U.S. PATENT DOCUMENTS

| | | | | |
|---|---|---|---|---|
| 2013/0311495 A1* | 11/2013 | Rossi | ............ | G06F 9/444 707/758 |
| 2014/0122791 A1* | 5/2014 | Fingerhut | ............ | H04L 49/00 711/108 |
| 2014/0245423 A1* | 8/2014 | Lee | ............ | H04L 63/0263 726/12 |
| 2014/0282830 A1* | 9/2014 | Davis, Jr. | ............ | H04L 63/0227 726/1 |
| 2014/0282855 A1* | 9/2014 | Clark | ............ | H04L 41/14 726/1 |

* cited by examiner

ANTI-MALWARE SYSTEM, METHOD OF PROCESSING PACKET IN THE SAME, AND COMPUTING DEVICE

CROSS-REFERENCE TO RELATED APPLICATION

This application claims priority to and the benefit of U.S. Provisional Patent Application No. 61/727,917 filed on Nov. 19, 2012, the disclosure of which is incorporated herein by reference in its entirety.

BACKGROUND

1. Field

The present disclosure relates to a system for use in providing a security solution, and more particularly, to a system including a hardware-based firewall (FW) engine and to a method of processing packets in such a system.

2. Discussion of Related Art

With the spread of the Internet, the number of pieces of malware or malicious codes, for example, a computer virus, a worm, a Trojan horse, a spyware program, a rootkit, a distributed denial of service (DDoS) attack, etc., designed to perform a malicious action against a user's intention, is drastically increasing, and, accordingly, there is a growing need for an anti-malware (AM) solution for effective security of a computer system.

In addition, with the widespread use of mobile devices such as a smartphone, a tablet, etc., it is deeply concerned that malware having attacked personal computers (PCs) would also have severe harmful effects on the mobile devices. Thus, an effective AM solution is required for the mobile devices as well.

An AM solution may include an FW solution for a personal FW. However, when the number of FW rules for packets increases in the personal FW, the time required for processing the packets increases. It is a crucial disadvantage for an FW solution to have a long response time to a packet transmitted in a network. Also, in case of mobile devices having relatively many limitations on resources such as a central processing unit (CPU) and a battery, the longer the time for packet processing is taken, the faster the battery will deplete.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

The present disclosure is directed to performing certain operations for providing a FW function at a high speed using a hardware-based FW engine, and to implementing other FW operations on a software level of a platform including the FW engine so that various security solutions can be provided.

Further, the present disclosure is directed to providing improved FW performance with a computing device having limited resources.

According to an exemplary embodiment, there is provided an anti-malware (AM) apparatus, including: a hardware-based firewall (FW) engine, including a packet matching engine configured to perform matching of a packet with a plurality of FW rules, and to generate a matching result; and an FW function module configured to determine an action for filtering the packet on the basis of the matching result.

According to an aspect of the AM apparatus, the packet matching engine includes: a plurality of rule keys derived from the plurality of FW rules; a packet key converted from the packet; and one or more packet matchers configured to compare the packet key with the plurality of rule keys.

According to an aspect of the AM apparatus, each of said one or more packet matchers includes a plurality of packet sub-matchers configured to operate in parallel, and further configured to compare a subset of the plurality of rule keys with the packet key.

According to an aspect of the AM apparatus, the hardware-based FW engine further includes a packet stream capture unit, and the packet stream capture unit is configured to extract data, related to the plurality of FW rules, from the packet and to provide the extracted data to the packet matching engine.

According to an aspect of the AM apparatus, the packet stream capture unit is further configured to extract the data from the packet so as to include data specific to at least one of a link layer protocol, a network layer protocol, and a transmission layer protocol.

According to an aspect of the AM apparatus, the plurality of FW rules further include a uniform resource locator (URL) filtering rule; the hardware-based FW engine further includes a URL filter; the packet stream capture unit is further configured to extract a URL portion from the packet and to provide the extracted URL portion to the URL filter; and the URL filter is configured to perform matching of the URL portion with the URL filtering rule.

According to an aspect of the AM apparatus, the plurality of FW rules further include a content filtering rule; the hardware-based FW engine further includes a content filter; the packet stream capture unit is further configured to extract at least one of a keyword and a pattern, from the packet, and to provide to the content filter the extracted at least one of the keyword and the pattern; and the content filter is configured to perform matching of the at least one of the keyword and the pattern with the content filtering rule.

According to an aspect of the AM apparatus, the FW function module is implemented as firmware.

According to an aspect of the AM apparatus, the FW function module is implemented as an application, said application being executed by an external CPU in cooperation with the hardware-based FW engine.

According to an aspect of the AM apparatus, the hardware-based FW engine includes a central processing unit (CPU) and a memory, and wherein the firmware implementing the FW function module is stored in the memory.

According to an aspect of the AM apparatus, the hardware-based FW engine is integrated with a processor, and wherein the processor includes a security execution environment module configured to virtualize the processor into different processors respectively corresponding to a normal mode and a security mode.

According to an aspect of the AM apparatus, the virtualized processor corresponding to the security mode is configured to execute an application received by the AM apparatus.

According to an aspect of the AM apparatus, the AM apparatus further includes a storage device connected to the processor, wherein the security execution environment module further virtualizes the storage device into different storage devices respectively corresponding to the general mode and the security mode.

According to an aspect of the AM apparatus, the virtualized storage device corresponding to the security mode stores the plurality of FW rules.

According to another exemplary embodiment, there is provided a method of processing a packet in an AM apparatus including: performing matching of the packet with a plurality of FW rules using a packet matching engine of a hardware-based firewall (FW) engine; generating a matching result; and determining, at an FW function module, an action for filtering the packet on the basis of the matching result.

According to an aspect of the method, the matching of the packet includes further includes: deriving a plurality of rule keys from the plurality of FW rules; converting a packet key from the packet; and comparing, at one or more packet matchers of the packet matching engine, the packet key with the plurality of rule keys.

According to an aspect of the method, the method further includes: operating, in parallel, in each of said one or more packet matchers, a plurality of packet sub-matchers; and carrying out the comparing of the packet key with the plurality of rule keys, at each of said one or more packet sub-matchers, by comparing a subset of the plurality of rule keys with the packet key.

According to an aspect of the method, the method further includes extracting, at a packet stream capture unit of the hardware-based FW engine, data, related to the FW rules, from the packet, and providing the extracted data to the packet matching engine.

According to an aspect of the method, the extracting of the data from the packet at the packet stream capture unit is performed so as to include data specific to at least one of a link layer protocol, a network layer protocol, and a transmission layer protocol.

According to an aspect of the method, the method further includes: extracting, at the packet stream capture unit, a uniform resource locator (URL) portion from the packet; providing the extracted URL portion to a URL filter of the hardware-based FW engine; and matching, at the URL filter, the URL portion with a URL filtering rule of the plurality of FW rules.

According to an aspect of the method, the method further includes: extracting, at the packet stream capture unit, at least one of a keyword and a pattern from the packet; providing the at least one of the keyword and the pattern to a content filter of the hardware-based FW engine; and matching, at the content filter, the at least one of the keyword and the pattern with a content filtering rule of the plurality of FW rules.

According to an aspect of the method, the method further includes providing the FW function module implemented as firmware.

According to an aspect of the method, the method further includes providing the FW function module as an application, said application being executed by an external CPU in cooperation with the hardware-based FW engine.

According to an aspect of the method, the hardware-based FW engine includes a central processing unit (CPU) and a memory, and wherein the providing of the FW function module includes storing the firmware in the memory.

According to an aspect of the method, the method further includes: using a security execution environment module to virtualize a processor integrated with the hardware-based FW engine into different processors respectively corresponding to a normal mode and a security mode; wherein the security execution environment module is included in the processor.

According to an aspect of the method, the method further includes executing an application using the AM apparatus on the virtualized processor corresponding to the security mode.

According to an aspect of the method, the method further includes virtualizing, at the security execution environment module, a storage device connected to the processor into different storage devices respectively corresponding to the normal mode and the security mode.

According to an aspect of the method, the plurality of FW rules are stored in the virtualized storage device corresponding to the security mode.

According to still another exemplary embodiment, there is provided a computing device, including: a CPU core, and an anti-malware (AM) apparatus configured to provide a security platform on which a firewall (FW) software application is executable, wherein the AM apparatus includes: a hardware-based FW engine including a packet matching engine configured to perform matching of a packet with a plurality of FW rules, and to generate a matching result; and an FW function module configured to determine an action for filtering the packet on the basis of the matching result.

Further details of various embodiments of the present disclosure are disclosed in the following detailed description and the accompanying drawings.

BRIEF DESCRIPTION OF THE DRAWINGS

The above and other objects, features, and advantages of the exemplary embodiments of the present disclosure will become more apparent to those familiar with this field from the following detailed description when taken in conjunction with the accompanying drawings, in which.

DETAILED DESCRIPTION OF EXEMPLARY EMBODIMENTS

Exemplary embodiments of the present disclosure will be described in detail below with reference to the accompanying drawings. However, the embodiments are merely examples and are not to be construed as limiting the present disclosure.

Various details already understood by those familiar with this field will be omitted to avoid obscuring the gist of the present disclosure. Terminology described below is defined considering functions in the present disclosure and may vary according to a user's or operator's intention or usual practice. Thus, the meanings of the terminology should be interpreted based on the overall context of the present specification.

The spirit of the present disclosure is determined by the claims, and the following exemplary embodiments are provided only to efficiently describe the spirit of the present disclosure to those of ordinary skill in the art.

Figure 1:
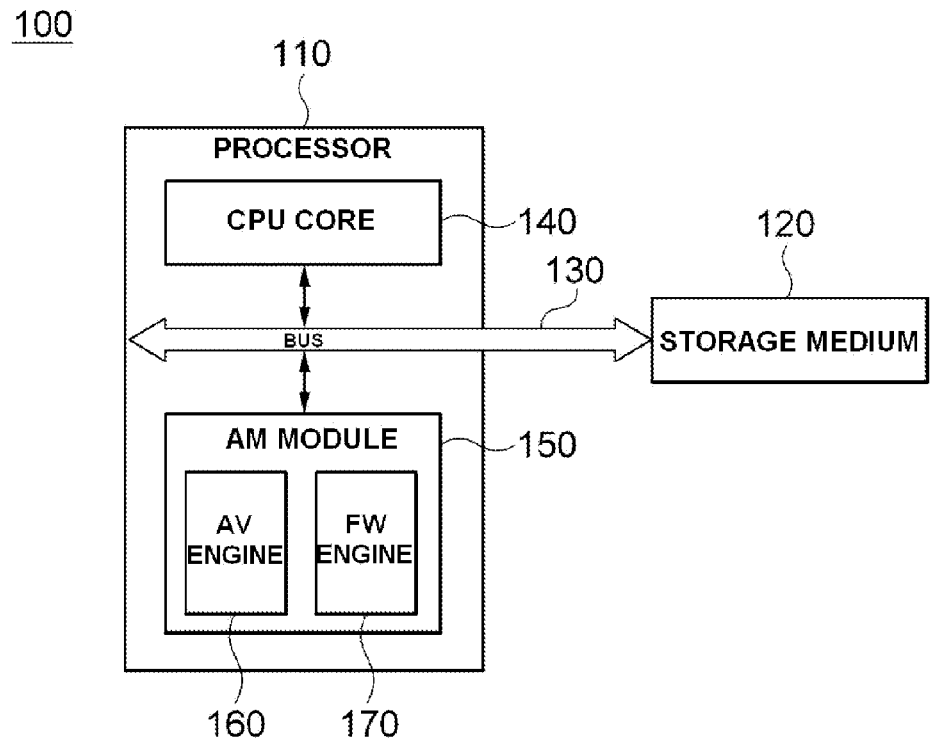
FIG. 1 is a diagram showing an example of an AM system that performs AM functions on the basis of hardware according to an exemplary embodiment of the present disclosure.

FIG. 1 is a diagram showing an example of an AM system that performs AM functions on the basis of hardware according to an exemplary embodiment of the present disclosure.

An AM system 100 includes a processor 110 such as an application processor, a storage medium 120 such as a read-only memory (ROM) and/or a random access memory (RAM), and a bus 130 that connects various hardware components including the storage medium 120 to the processor 110. The processor 110 may include at least one CPU core 140. The storage medium 120 may include many different types of storage media having different performance characteristics. The bus 130 may include a memory bus or memory controller, a peripheral bus, and a local bus using any of various bus architectures.

The storage medium 120 of the AM system 100 is configured to store instructions executable by a processing unit such as the processor 110. For example, the instructions stored in the storage medium 120 may include instructions of an operating system (OS) for operating the various components, and instructions of AM software running on the OS. As will be described later, the AM software may be configured to provide AM functions to a user of the AM system 100. In certain embodiments, drivers for the hardware components, libraries, firmware, and various types of application software may be stored in the storage medium 120. In accordance with different embodiments, the drivers, the libraries, the firmware and/or the application software may be stored in a different storage medium.

The AM system 100 further includes an AM module 150 for malware detection. As shown in FIG. 1, the AM module 150 may be included in the processor 110. The AM module 150 is connected through the bus 130 to the CPU core 140 and the storage medium 120. The AM module 150 includes at least one hardware-based engine, for example, an anti-virus (AV) engine 160 and/or a firewall (FW) engine 170. The AV engine 160 may perform hash matching on certain data for AV scanning of the data. The FW engine 170 may perform an FW function of filtering a packet. In a certain exemplary embodiment, the AM module 150 may be configured in the form of a system-on-chip (SoC). Such a SoC is configured as a single chip having hardware logic and firmware for malware detection. In another exemplary embodiment, the AM module 150 may be configured in the form of hardware logic (e.g., the AV engine 160 and/or the FW engine 170) only and may cooperate with certain software (e.g., an application) executed by an external CPU for malware detection.

The exemplary AM system 100 may be included in a computing device having stored thereon data and/or files to be scanned. The computing device may be a mobile device, such as a smartphone or a tablet, etc., an embedded device, a desktop computer, or so on.

Figure 2:
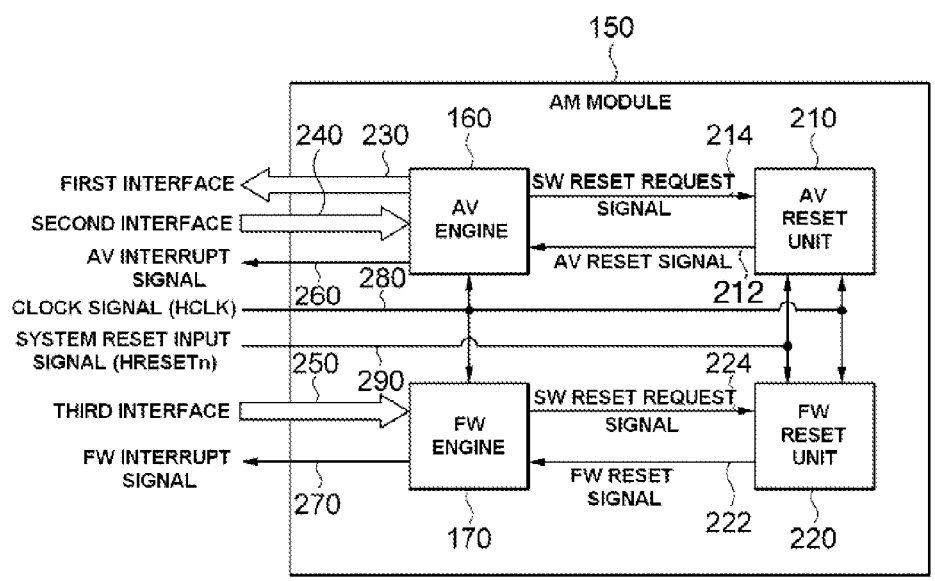
FIG. 2 shows a constitution of an AM module according to an exemplary embodiment of the present disclosure.

The exemplary AM module 150 may be constituted in various ways. For example, as shown in FIG. 2, the AM module 150 includes the AV engine 160 and the FW engine 170. In addition, the AM module 150 may further include an AV reset unit 210 and an FW reset unit 220.

In FIG. 2, the AV engine 160 and the FW engine 170 may operate independently of each other. The AV engine 160 reads data (e.g., the whole or a part of a database or a file) in word units (e.g., four bytes) from a master device (e.g., the storage medium 120 of the AM system 100) external to the AM module 150 through a first interface 230. The external master device may control the AV engine 160 and check a state of the AV engine 160 through a second interface 240, and control the FW engine 170 and check a state of the FW engine 170 through a third interface 250. The AV engine 160 and the FW engine 170 output an AV interrupt signal 260 and an FW interrupt signal 270, respectively.

The AV engine 160 and the FW engine 170 receive a clock signal HCLK 280. FIG. 1 shows that the clock signal 280 is used in common for the AV engine 160 and the FW engine 170, which is, however, merely illustrative.

The AV reset unit 210 may receive a software reset request signal 214 from the AV engine 160 and a system reset input signal HRESETn 290 from an external of the AM module 150 to provide an AV reset signal 212 to the AV engine 160. The FW reset unit 220 may receive a software reset request signal 224 from the FW engine 170 and the externally applied system reset input signal 290 to provide an FW reset signal 222 to the FW engine 170. FIG. 1 shows that the system reset input signal 290 is used in common for the AV reset unit 210 and the FW reset unit 220, which is, however, merely illustrative.

Certain exemplary embodiments involve integration of the AM module 150 and the processor 110. The AM module 150 may be integrated with the processor 110 in various ways. For example, as shown in FIG. 3 and FIG. 4, the AM module 150 may be integrated into the processor 110.

Figure 3:
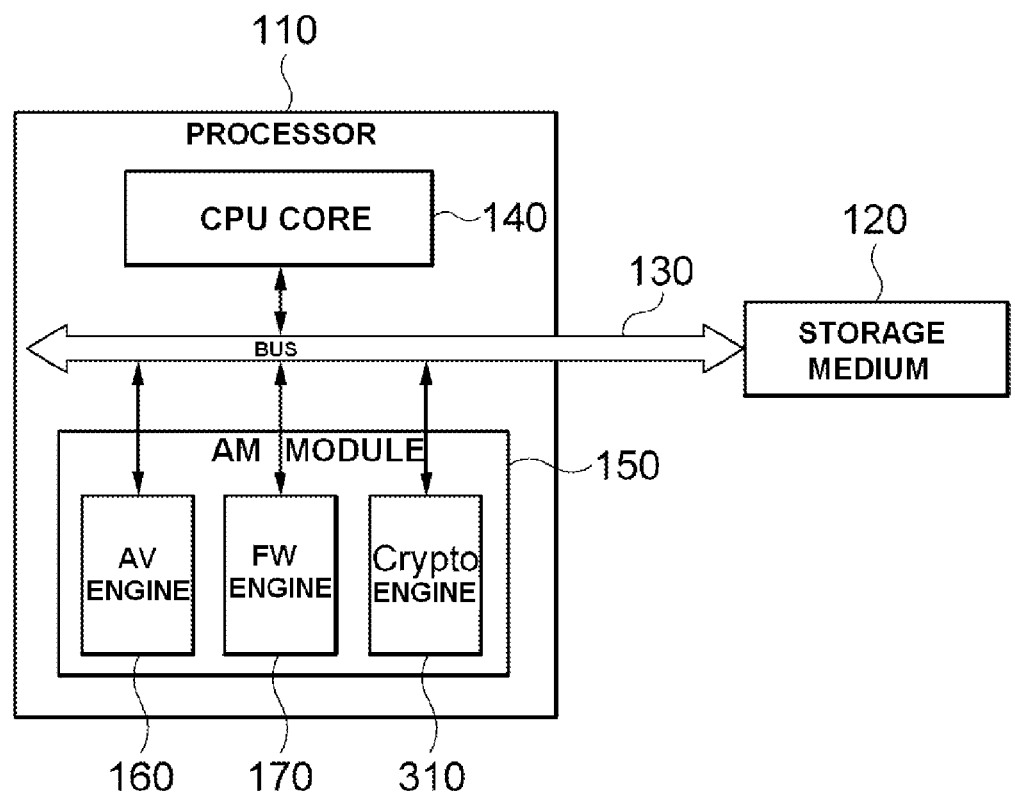
FIG. 3 illustrates a non-isolated scheme of integrating an AM module with a processor according to an exemplary embodiment of the present disclosure.

As an example, the AM module 150 illustrated in FIG. 3 is integrated with the processor 110 such that it can use the CPU core 140 in the processor 110 and a designated area of a certain memory (e.g., the storage medium 120) through the bus 130. This is referred to as a non-isolated scheme. According to the non-isolated scheme, the AV engine 160 and the FW engine 170 of the AM module 150 are connected to the CPU core 140 of the processor 110 through the bus 130, and also connected to an external memory (e.g., the storage medium 120) through the bus 130. The AM module 150 of FIG. 3 may have an additional engine (e.g., a crypto engine 310), which is also connected to the CPU core 140 and the storage medium 120 through the bus 130. According to the non-isolated scheme, the AM module 150 may enable relatively rapid data detection using the CPU core 140 of the processor 110.

Figure 4:
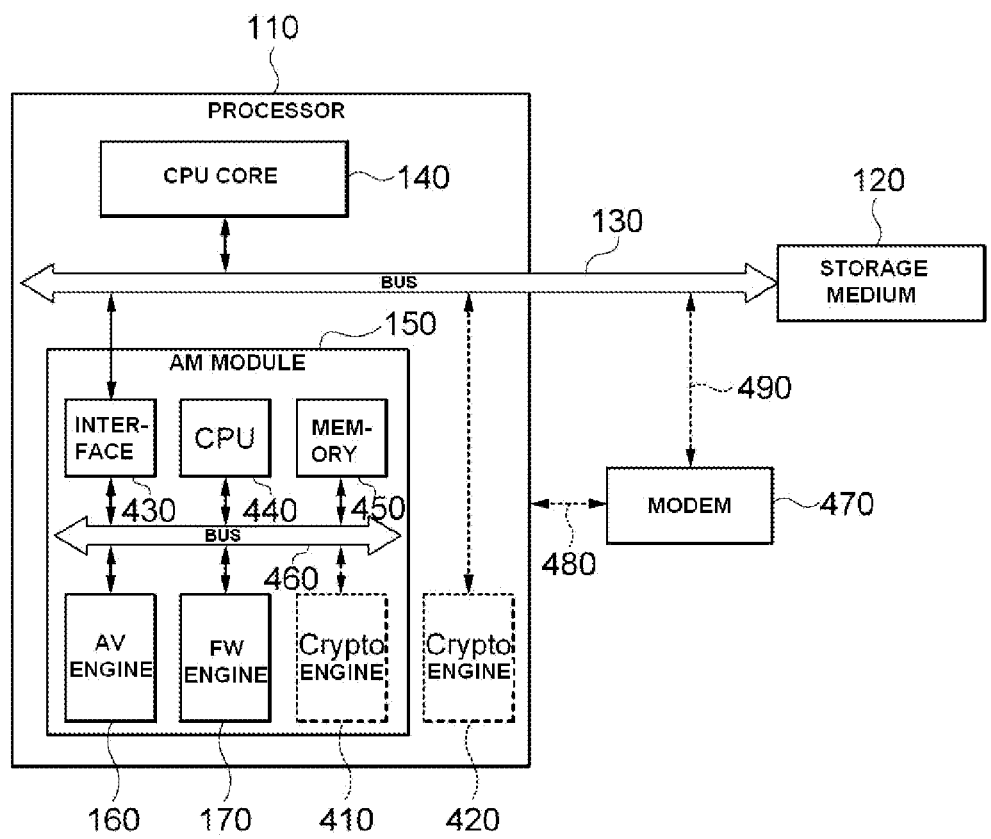
FIG. 4 illustrates an isolated scheme of integrating an AM module with a processor according to an exemplary embodiment of the present disclosure.

As another example, the AM module 150 illustrated in FIG. 4 is integrated with the processor 110 according to an isolated scheme. The AM module 150 itself of FIG. 4 includes a CPU 440 and a memory 450. According to the isolated scheme, the AM module 150 may use the CPU 440 and the memory 450 to reduce use of the CPU core 140 of the processor 110. According to the scheme shown in FIG. 4, the AV engine 160 and the FW engine 170 of the AM module 150 are connected through an internal bus 460 to the CPU 440, the memory 450, and an interface 430. The interface 430 connects the AM module 150 to the CPU core 140 and the storage medium 120 through the bus 130. Likewise, an additional engine (e.g., a crypto engine 410) included in the AM module 150 may be connected through the bus 460 to the interface 430, the CPU 440, and the memory 450 in the AM module 150. Alternatively, another engine (e.g., a crypto engine 420) located outside the AM module 150 may be directly connected to the bus 130 to use the CPU core 140 of the processor 110.

Meanwhile, a dotted line 480 of FIG. 4 denotes that the AM module 150 may be integrated with a modem 470 external to the processor 110. According to such a modem integration scheme, the AM module 150 is present between a network stack of the OS (not shown) and the modem 470, and may be used to detect a harmful packet for the security of the AM system 100 including the AM module 150. Further, according to the modem integration scheme, the usage of the CPU core 140 of the processor 110 is low. In this case, the AM module 150 may directly receive a network packet through the modem 470 and process the packet in the transport layer.

Alternatively, a dotted line 490 of FIG. 4 denotes that the AM module 150 is integrated with the processor 110 while the modem 470 is connected to the processor 110 through the bus 130. In this case, since the AM module 150 serves as a coprocessor (e.g., the CPU 440) in the AM system 100, the AM module 150 may detect a packet for use in the CPU core 140 of the processor 110, thereby facilitating network packet processing over layers including the application layer to the transport layer.

Figure 5:
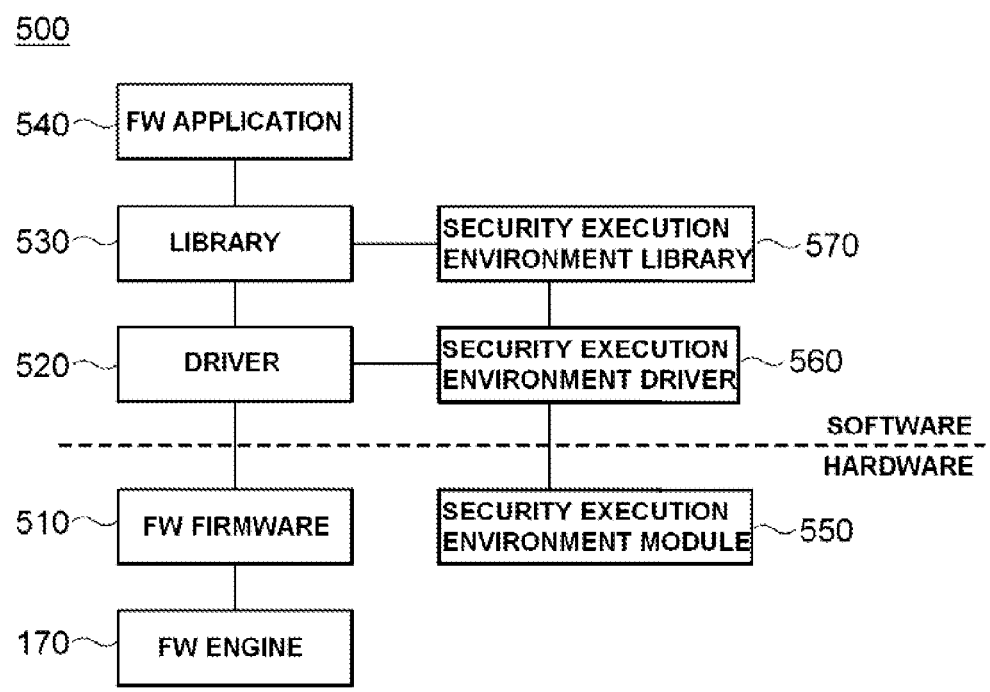
FIG. 5 illustrates a security platform provided by an AM system according to an exemplary embodiment of the present disclosure.

FIG. 5 illustrates a security platform provided by an AM system according to an exemplary embodiment of the present disclosure.

An exemplary security platform 500 includes a hardware level and a software level. Sub-modules of each level may be modified or extended according to the design of the platform 500. Such modules implement certain functions to be performed on the platform 500. In other words, certain functional modules operate on the platform 500. These functional modules are implemented at the hardware level or the software level of the platform 500. For example, the FW function may be performed on the platform 500, and to this end, the platform 500 operates a certain FW function module. Using the FW function module, an application (e.g., an FW application 540) may be executed at the software level of the platform 500.

In the hardware level of the platform 500, a hardware-based FW engine 170 is included. An exemplary constitution of the hardware-based FW engine 170 will be described later. In the hardware level of the platform 500, an AV engine 160 may be further included, and a crypto engine(s) 310, 410, and/or 420 for performing an encryption function may be additionally included. The constitution of the platform 500 will be described below particularly in terms of the FW function among the functions of the platform 500.

In the hardware level of the platform 500, FW firmware 510 may be further included. At the hardware level of the platform 500, the FW firmware 510 implements a functional module that performs certain operations for the FW function. The instructions of the FW firmware 510 may be stored in a certain memory and executed by a certain processing unit. For example, when the AM module 150 including the FW engine 170 is integrated with a processor 110 according to the isolated scheme, the instructions of the FW firmware 510 may be stored in the memory 450 of the AM module 150 and executed by the CPU 440 of the processor 110. By way of another example, when the AM module 150 including the FW engine 170 is integrated with the processor 110 according to the non-isolated scheme, the instructions of the FW firmware 510 may be stored in the storage medium 120 and executed by the CPU core 140 of the processor 110. However, it will be understood that the foregoing examples are illustrative and that variations may be made therein.

The software level of the platform 500 includes a driver 520, a library 530, and a FW application 540. The instructions of the driver 520, the instructions of the library 530 and the instructions of the FW application 540 may be stored in a certain memory (e.g., the storage medium 120) and executed by a certain processing unit (e.g., the processor 110). A functional module for performing certain operations for the FW function is implemented as software by the driver 520 and/or the library 530. Also, the driver 520 provides an interface with the hardware level of the platform 500. The FW application 540 is software for providing an FW solution on the basis of the platform 500. The FW application 540 may use and/or control the platform 500 through, for example, an application programming interface (API) provided by the library 530, and receive an output from the platform 500 using a callback function.

In the platform 500, the firmware 510, the driver 520, and/or the library 530 may implement operations that need to be frequently updated to cope with new malicious codes and strengthen security. According to how closely the AM module 150 is related with the processor 110 (e.g., how the AM module 150 is integrated with the processor 110), an operation to be performed on the platform 500 may be implemented in firmware at the hardware level or in a driver or a library at the software level.

In a certain exemplary embodiment, the hardware-based FW engine 170 performs packet matching operations of matching a certain rule with a packet on which a filtering action (e.g., allowing, dropping, or logging of the packet) will be performed. Also, the hardware-based FW engine 170 may perform uniform resource locator (URL) filtering operations, content filtering operations, and packet stream capture operations. The URL filtering operations include operations of matching URL filtering rules with a URL of a hypertext transfer protocol (HTTP) packet or a point-to-point tunneling protocol (PPTP) packet. The content filtering operations apply content filtering rules regarding a specific keyword, pattern, etc. to packets including content such as document and image files, and may be performed in a way similar to the URL filtering operations. The packet stream capture operations include operations of converting a packet incoming from or outgoing to a network medium into an appropriate format for operations of the FW engine 170.

When the AM module 150 is integrated with the processor 110 according to the isolated scheme, some processing operations related to the above operations may be implemented by the FW firmware 510 at the hardware level. For example, certain operations for analyzing a packet may be implemented by the FW firmware 510, and other processing operations may be implemented by the library 530 and/or the driver 520. The operations of the FW function module implemented as the FW firmware 510 include packet filtering operations of causing the packet matching operations to initiate and determining an action for filtering a packet on the basis of results of the packet matching operations, and/or transmission control protocol (TCP) verification operations of tracking a TCP connection state according to an analysis of a TCP packet.

Alternatively, certain processing operations including the packet filtering operations and/or the TCP verification operations may be implemented as software by the driver 520 and/or the library 530. For example, when the AM module 150 is integrated with the processor 110 according to the non-isolated scheme, the platform 500 may be configured in this manner.

A security solution based on the platform 500 may enable respective vendors to make the best use of advantages of the hardware-based AM module 150 in the course of developing various applications (e.g., the FW application 540). Thus, for the security solution, hardware-based improvement in its performance can be achieved while its unique security functions can be implemented as software.

Furthermore, the platform 500 may involve an enhanced security structure. A computing device including an AM system 100 that provides such a platform 500 is improved in the stability of security.

In an exemplary embodiment, a module 550 for providing a security execution environment to the hardware level of the platform 500 is included in the hardware level of the platform 500. The security execution environment module 550 may be included in the processor 110 integrated with the FW engine 170. The security execution environment module 550 may support platform authentication, generation/storage of a measurement value for integrity check, protection of data storage, and so on. The security execution environment module 550 interfaces with a higher level function (e.g., the FW function provided by the driver 520 and/or the library 530) through a security execution environment driver 560 and/or a security execution environment library 570.

The security execution environment module 550 allows the operating environment of (the CPU core 140 and/or the CPU 440 of) the processor 110 to have a normal mode and a security mode, and virtualizes the processor 110 into two processors corresponding to the respective modes. Applications at the software level of the platform 500 are executed on the virtualized processor corresponding to the normal mode or the security mode. In other words, applications at the software level of the platform 500 are logically classified as either normal or security applications, where the normal application and the security application may be respectively executed on the two virtualized processors as if they were executed on two separate processors. For example, the FW application 540 using the AM system 100 is executed on the virtualized processor corresponding to the security mode.

The security execution environment module 550 logically partitions a storage device or a peripheral device connected to (the CPU core 140 and/or the CPU 440 of) the processor 110, as well as the processor 110, and virtualizes the storage device or the peripheral device into devices corresponding to the respective modes.

Such logical partitioning enables the following. First, security-critical portions, for example, a certain library and/or driver (e.g., the library 530 and/or the driver 520), a key, FW rules, a virus signature database, etc., may be stored in the virtualized storage medium corresponding to the security mode. When the stored library and/or driver is installed or updated, performing an integrity checking process through a mechanism such as electronic signature, etc. may prevent the contents of the library and/or driver from being tampered with or damaged or from being improperly updated. Likewise, when the virus signature database and the FW rules are updated, the tampering and improper update of their contents can be prevented. Also, it is possible to prevent the library, the drive, the FW rules, and the virus signature database from being updated by a source posing as a trustworthy update server. Furthermore, a process for authenticating an application operating in the normal mode may be executed in the security mode so as to prevent the application from being tampered with.

Figure 6:
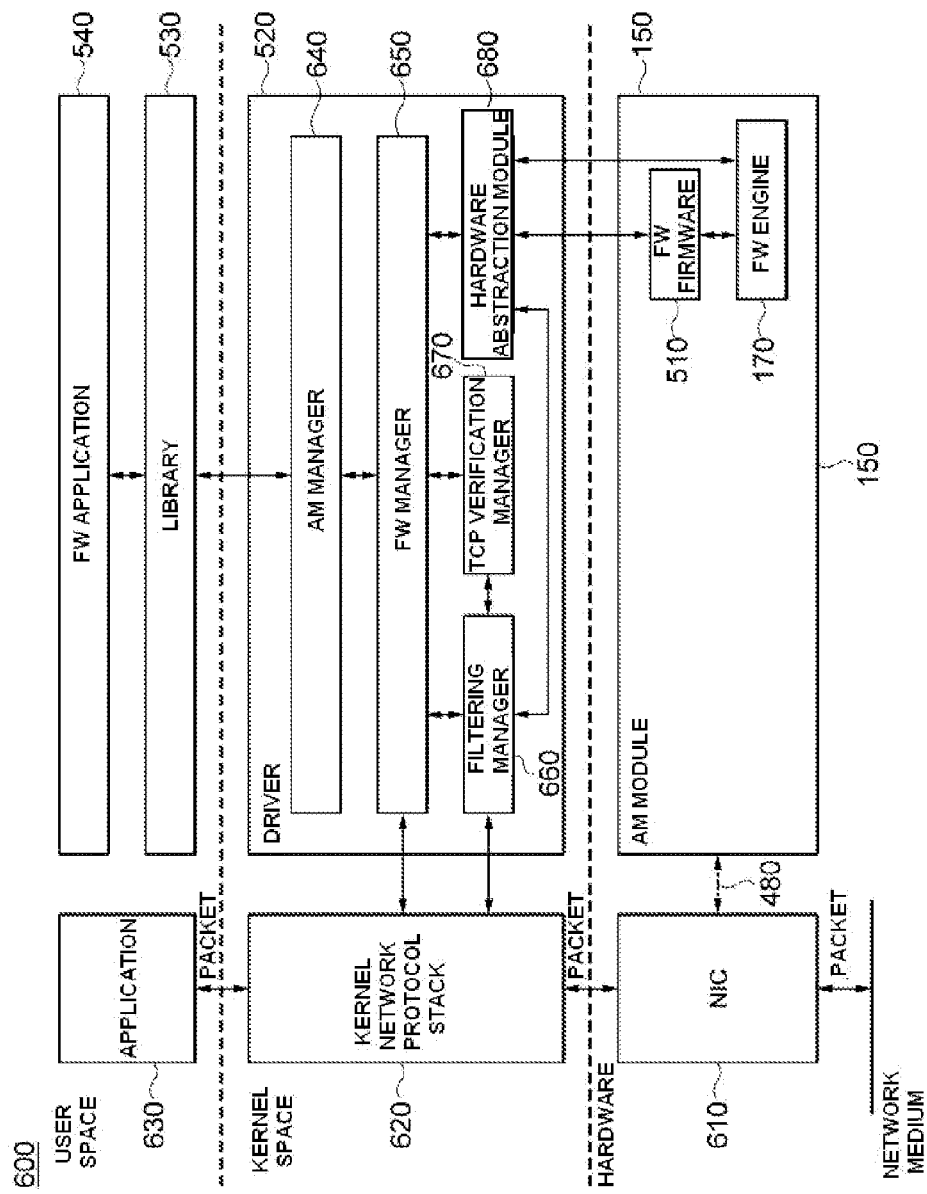
FIG. 6 is a diagram for illustrating operations of exemplary modules for providing a FW function on a security platform according to an exemplary embodiment of the present disclosure.

FIG. 6 is a diagram for illustrating operations of exemplary modules for providing the FW function on a security platform according to an exemplary embodiment of the present disclosure.

A computing device 600 includes the AM system 100 that provides the platform 500 described above. The computing device 600 includes a network interface card (NIC) 610. Through the NIC 610, a packet is input from a network medium or output to the network medium. The NIC 610 belongs to the hardware level of the platform 500 implemented in the computing device 600. A kernel space including service modules executed on an OS of the computing device 600 and a user space including processes called/performed by a user in the computing device 600 correspond to the software level of the platform 500. A kernel network protocol stack 620 as well as the driver 520 may be included in the kernel space. The kernel network protocol stack 620 is a network stack of the OS, and delivers a packet to be filtered to a module at the software level (e.g., a filtering manager that will be described later) so that the packet can be allowed or dropped. In addition to the library 530 and the FW application 540, an application 630 executed by the user of the computing device 600 may be included in the user space. An example of the application 630 may be a web browser, an instant messenger, etc. using packet data.

A packet incoming from the network medium through the NIC 610 may be delivered to the application 630 via the kernel network protocol stack 620, and a packet generated by the application 630 may be output to the network medium via the kernel network protocol stack 620 and the NIC 610.

The FW application 540 provides a unique FW solution related to such a packet. The FW application 540 uses and/or controls the FW engine 170 and other FW function modules (e.g., the FW firmware 510, the driver 520, and/or the library 530) based on the FW engine 170. The library 530 is an interface between the FW application 540 and the driver 520, and the driver 520 communicates with the library 530 through an AM manager 640 of the driver 520.

The driver 520 includes an FW manager 650, a filtering manager 660, a TCP verification manager 670, and a hardware abstraction module 680, as well as the AM manager 640.

The FW manager 650 controls FW function modules and queries their states. Also, the FW manager 650 may register a network packet hook function in a certain module (e.g., a netfilter module) in the kernel network protocol stack 620 and release the function from the module.

Also, the FW manager 650 may insert and delete FW rules. The FW rules include packet matcher rules, URL filtering rules, and/or content filtering rules. A database of the FW rules may be managed according to these types of FW rules.

The packet matcher rules may be stored in the FW engine 170 in the form of a processed key. For example, a maximum of 512 packet matcher rules may be set to support Internet protocol version 4 (IPv4), and a maximum of 256 packet matcher rules may be set to support both of IPv4 and Internet protocol version 6 (IPv6). One URL filtering rule may be divided into two filtering rules. For example, on the basis of a character "/," two filtering rules respectively corresponding to a domain name portion and a path portion may be derived. The content filtering rules may be related to a keyword, a pattern, etc. included in a document or an image file.

The FW rules may be inserted in the hardware abstraction module 680. The FW rules may be inserted in priority order of the FW rules. For example, the packet matcher rules may have the following two types. First, packet matcher rules of a conditional rule type include condition 1 rules and condition 2 rules. According to the conditional rule type, when a condition of a condition 1 rule is satisfied, a condition2 rule is activated for a predetermined time. Secondly, packet matcher rules of a general rule type have no relationships between several rules. Condition 2 rules have the highest priority among the rules. Condition 1 rules and general rules have the same priority, and a first-inserted one of the general and the condition 1 rules has a higher priority. The rules are inserted into the hardware abstraction module 680 in a descending order of priority. Meanwhile, with the insertion of the FW rules, a data structure called a rule mapping table may be generated, which is used to refer to an action according to a result of matching, performed by the FW engine 170, of a packet with a rule.

The filtering manager 660 is a module that analyzes a packet and determines a filtering action for the packet. Further, the filtering manager 660 inserts a packet into the hardware abstraction module 680, and requests matching between the packet and FW rules. As an example, the filtering manager 660 allows analysis of a packet delivered from the kernel of the OS to be performed, and determines a filtering action according to results of the analysis. For example, through the determination, packet filtering may be performed according to an IP blacklist and/or an IP whitelist. As another example, the filtering manager 660 may check whether or not a TCP packet is an HTTP request message packet, and then allow a URL filtering operation to be performed. Content filtering may also be performed in a similar way.

The TCP verification manager 670 analyzes a TCP packet and tracks a TCP connection state. Using such tracking, verification of the corresponding packet is performed. The TCP verification manager 670 may track the TCP connection state according to a previously-defined finite state machine. Also, according to the TCP connection state, the TCP verification manager 670 may allow dynamic packet filtering to be performed, or may determine whether or not the connection state is normal and cause abnormal traffic to be blocked.

The hardware abstraction module 680 sets the FW engine 170 and checks a state of the FW engine 170. The hardware abstraction module 680 requests matching from the FW engine 170, and then receives match results. The hardware abstraction module 680 inputs, into the FW engine 170, a packet to be filtered and FW rules to be matched with the packet so that the matching between the packet and the FW rules is performed in the FW engine 170. For example, the packet and the FW rules may be converted into keys at the hardware abstraction module 680 and inserted in the FW engine 170, or may be converted into keys at the FW engine 170.

Figure 7:
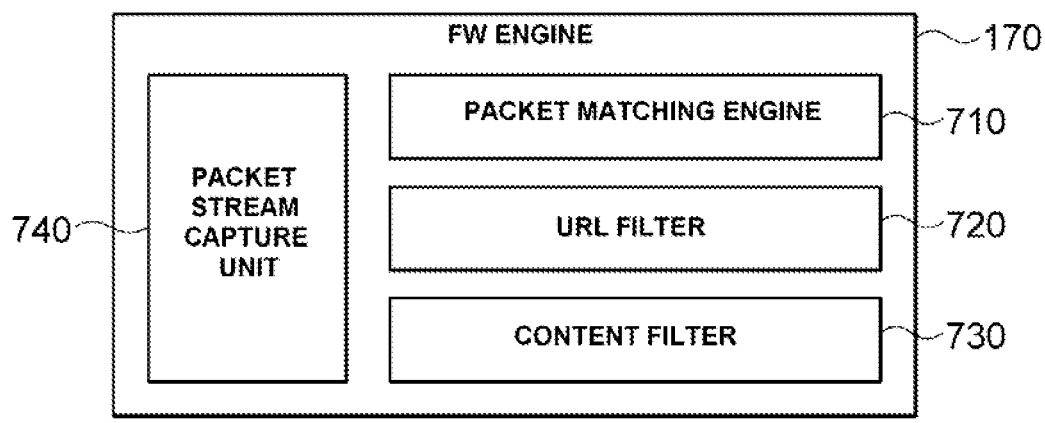
FIG. 7 shows a constitution of a hardware-based FW engine according to an exemplary embodiment of the present disclosure.

The hardware-based FW engine 170 is a module that performs operations for use in providing FW functions on the basis of hardware as mentioned above. For example, according to the hardware constitution shown in FIG. 7, the hardware-based FW engine 170 includes a packet matching engine 710 that performs packet matching operations, a URL filter 720 that performs URL filtering operations, and a content filter 730 that performs content filtering operations. Also, the FW engine 170 may further include a packet stream capture unit 740 for converting a packet into an appropriate format for the operations.

The packet matching engine 710 performs a packet matching operation, which is a basic operation for FW functions. The matching operation between a packet to be filtered and FW rules may involve comparison between a packet key converted from the packet and a rule key derived from the FW rules. For example, a packet key input to the packet matching engine 710 may be 128 bits or 256 bits. Rule keys that are stored in the packet matching engine 710 and compared with the packet key of 128 bits or 256 bits may be 512 160-bit keys or 256 320-bit keys, respectively.

Figure 8:
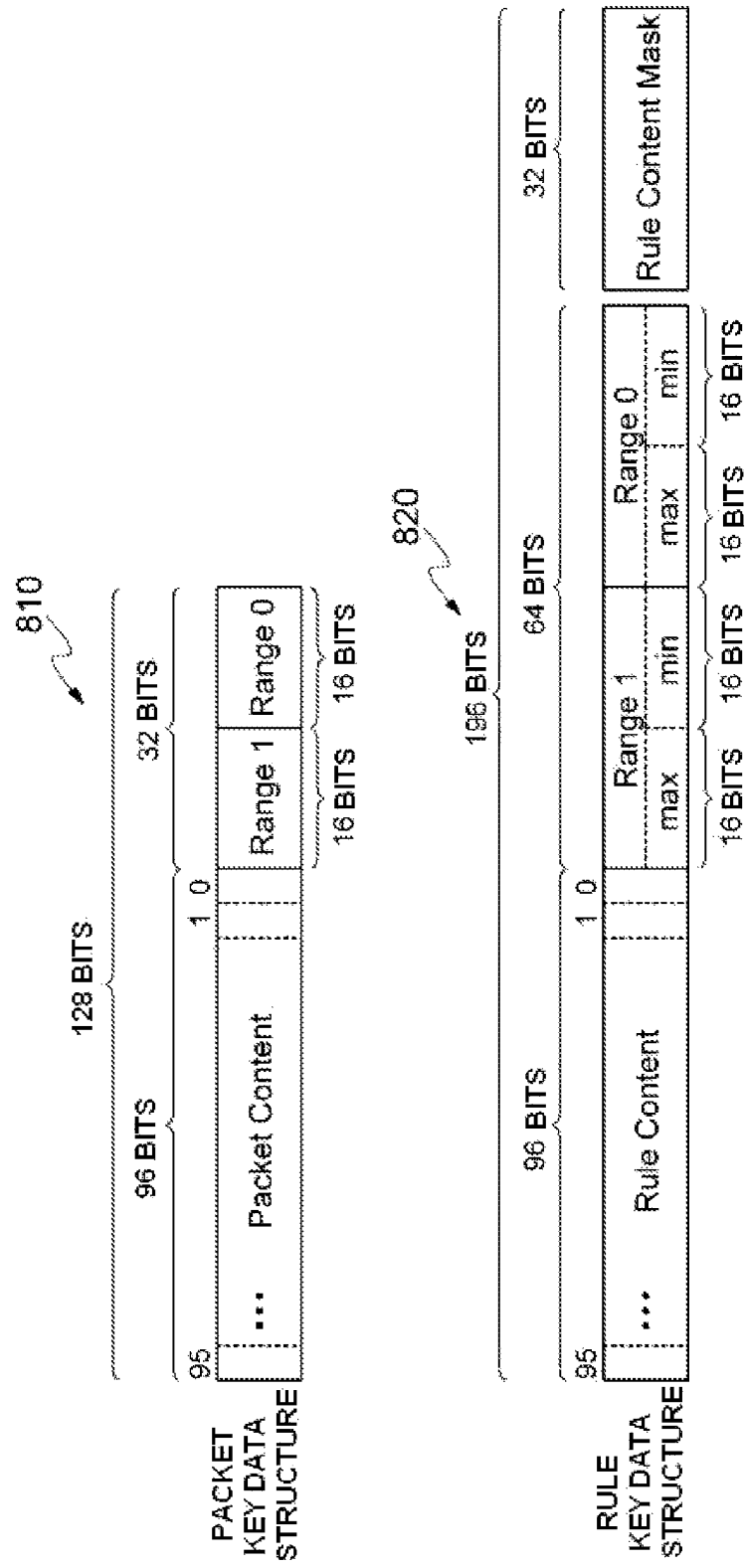
FIG. 8 shows exemplary data structures of a packet key and a rule key for use in a packet matching engine according to an exemplary embodiment of the present disclosure.

FIG. 8 shows exemplary data structures of a packet key and a rule key used in a packet matching engine according to an exemplary embodiment of the present disclosure.

In FIG. 8, a packet key data structure 810 is a structure of the 128-bit packet key illustrated above. The packet key data structure 810 includes 96-bit Packet Content and two 16-bit comparison areas (i.e., Range 0 and Range 1). In the 96-bit Packet Content, the 94 upper bits stores packet content, and the two lower bits are dummy bits and stores results of comparing the comparison areas of a packet key and those of a rule key. Meanwhile, a rule key data structure 820 has the following format. The rule key data structure 820 is a 160-bit rule key corresponding to 128 bits that is an aforementioned packet key size, and includes 96-bit Rule Content and two 32-bit comparison areas (i.e., Range 0 and Range 1). In addition, the rule key data structure 820 includes a 32-bit rule content mask for a given rule key. Thus, the rule key data structure 820 has a total of 196 bits. In the Rule Content, the 94 upper bits stores rule content, and the two lower bits denote a mask related to the comparison areas.

A packet key and rule keys are stored in the packet matching engine 710. In particular, the packet matching engine 710 may include a rule key memory (not shown) for storing a plurality of rule keys to be compared with the packet key. The rule key memory may be one array, or may be implemented in the form of a plurality of arrays. For example, the rule key memory may be configured with two arrays of 192 bits×256 bits to store 512 160-bit rule keys and 32-bit content masks of the respective rule keys.

In a matching operation between a packet and FW rules, a mask is used to compare a packet key with some rule keys and/or only compare the packet key with some bits. instead of comparing the packet key with all rule keys bit by bit. In addition to the rule content mask of FIG. 8, a Rule Row Mask and a Rule Column Mask may be included in the packet matching engine 710. The Rule Row Mask and the Rule Column Mask may be stored in the rule key memory, or stored separately from the rule key memory.

When the rule key memory is configured with two arrays of 192 bits×256 bits as mentioned above, a 256-bit Rule Row Mask may be used for each array, and a 96-bit Rule Column Mask may be used for rule content bits of rule keys stored in the arrays. For example, a rule key corresponding to a bit set to 1 in the Rule Row Mask is compared with the packet key, and the rule key is compared with the packet key at every bit corresponding to a bit set to 1 in the Rule Column Mask.

Figure 9:
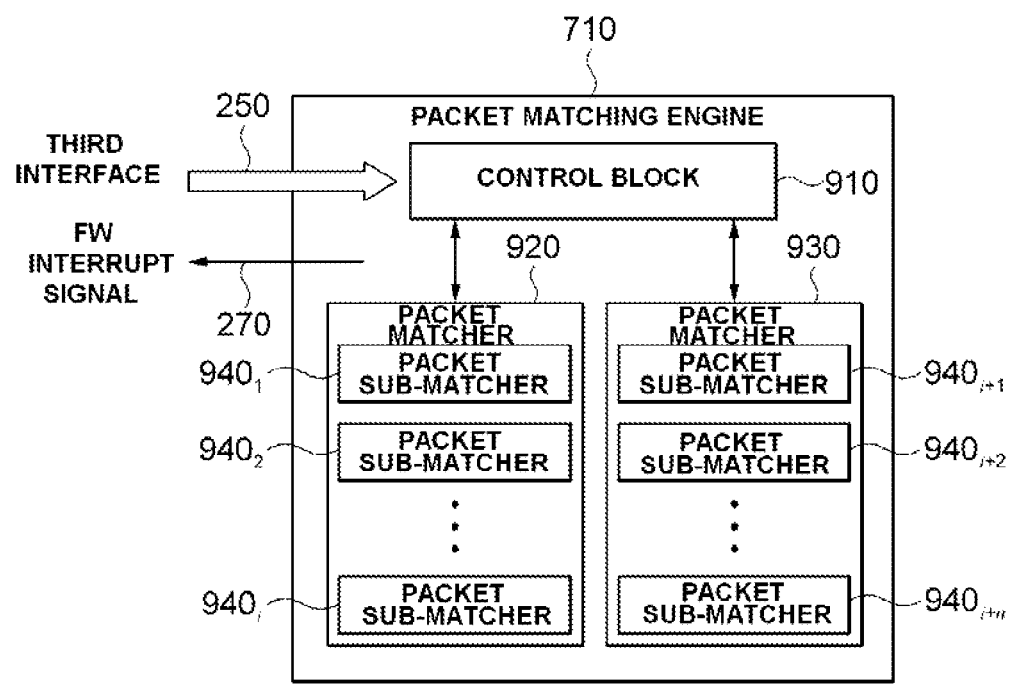
FIG. 9 shows a constitution of a packet matching engine according to an exemplary embodiment of the present disclosure.

FIG. 9 shows a constitution of a packet matching engine according to an exemplary embodiment of the present disclosure.

The packet matching engine 710 includes a control block 910 and one or more packet matchers 920 and 930. Each of the packet matchers 920 and 930 may include a plurality of packet sub-matchers $940_1$, $940_2$, . . . , $940_i$, $940_{i+1}$, $940_{i+2}$. . . . , and $940_{i+n}$.

The control block 910 controls the packet matching engine 710 and stores a state of the packet matching engine 710. The control block 910 generates an address signal and a control signal of the rule key memory of the packet matching engine 710. Also, the control block 910 stores results of comparing, at the packet matchers 920 and 930, a packet key and a rule key. In a certain exemplary embodiment, the control block 910 may include a register for storing a Rule Row Mask and a Rule Column Mask.

The packet matching engine 710 shown in FIG. 9 includes the two packet matchers 920 and 930. For example, a packet key of the aforementioned 128-bit data structure may be input to the respective packet matchers 920 and 930. Also, the rule key memory of the packet matching engine 710 may be divided into two arrays of 192 bits×256 bits, and the two arrays may correspond to the packet matchers 920 and 930, respectively. In a certain exemplary embodiment, the respective arrays may be included in the corresponding packet matchers 920 and 930. However, such a configuration of the rule key memory is merely an example. The rule key memory of the packet matching engine 710 may be used to store 512 160-bit rule keys or 256 320-bit rule keys according to a setting of a user.

In a certain exemplary embodiment, each of the packet matchers 920 and 930 may include eight packet sub-matchers (e.g., for the reference numerals $940_1, 940_2, \ldots, 940_i, 940_{i+1}, 940_{i+2}, \ldots$, and $940_{i+n}$ indicating the packet sub-matchers shown in FIG. 9, i=n=8). In the respective packet matchers 920 and 930, 256 rules keys are divided into eight groups. Each of the total of 16 packet sub-matchers $940_1$ to $940_{i+n}$ compares 32 rule keys with a packet key.

A packet of each of the packet matchers 920 and 930 is input to the packet sub-matchers $940_1$ to $940_{i+n}$ included in the packet matcher 920 and 930, and the address signal and the control signal of the rule key memory are generated by the control block 910 and input to the packet sub-matchers $940_1$ to $940_{i+n}$. Each of the packet sub-matchers $940_1$ to $940_{i+n}$ loads a rule key stored in the rule key memory according to the address signal and performs a logical operation of comparing the loaded rule key with a packet key.

The aforementioned address signal and/or control signal may be concurrently input to the packet sub-matchers $940_1$ to $940_{i+n}$. In this case, the 16 packet sub-matchers $940_1$ to $940_{i+n}$ in the exemplary packet matching engine 710 may perform matching between the packet and the rules by performing the logical operation of comparing a rule key with the packet key in parallel. The operation rate of the packet matching engine 710 varies according to the number of rule keys compared by the packet sub-matchers $940_1$ to $940_{i+n}$ of the packet matching engine 710. For example, when three clocks are required to compare one rule key with a packet key, the respective packet matchers 920 and 930 process 256 rule keys with 96 (=(256/8)*3) clocks. When multi-matching is enabled in this manner, even if the number of rules increases, the time required for such matching may be reduced. A memory for the multi-matching may have the structure of a content associative memory (CAM). When a packet key is input to the memory of the CAM structure and then a rule key that matches the input packet key is detected in the memory, an address indicating a position at which the rule key is stored may be output. Each of the packet matchers 920 and 930 may further include a result block (not shown). In the result block, results of the logical operations performed by the packet sub-matchers $940_1$ to $940_{i+n}$ are stored. The control block 910 of the packet matching engine 710 may receive the results stored in the result blocks.

Figure 10:
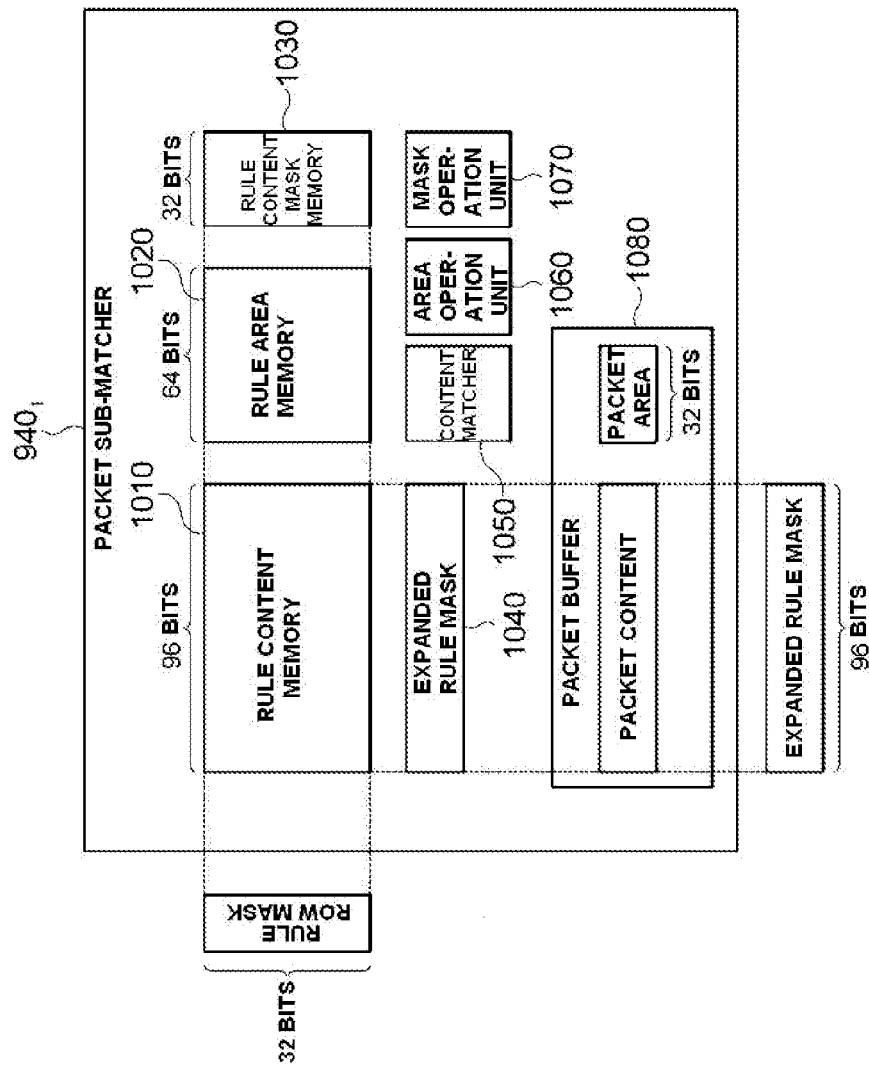
FIG. 10 shows a constitution of a packet sub-matcher according to an exemplary embodiment of the present disclosure.

FIG. 10 shows a constitution of a packet sub-matcher according to an exemplary embodiment of the present disclosure. FIG. 10 shows a constitution of the packet sub-matcher $940_1$, and the other packet sub-matchers $940_2$ to $940_{i+n}$ may also have the same constitution.

A packet buffer 1080 stores a packet input to the packet matching engine 710. The packet stored in the packet buffer 1080 includes 96-bit Packet Content and a 32-bit comparison area.

In the packet sub-matcher $940_1$, a rule content memory 1010 of 96 bits×32 bits, a rule area memory 1020 of 64 bits×32 bits, and a rule content mask memory 1030 of 32 bits×32 bits store rule content, comparison areas, and a rule content mask of 32 rule keys, respectively. The rule content memory 1010, the rule area memory 1020, and the rule content mask memory 1030 may be a buffer that receives the 32 rule keys processed by the packet sub-matcher $940_1$ from a rule key memory of the packet matching engine 710 and stores the 32 received rule keys, or a part of the rule key memory. According to an address signal from a control block 910, rule content, comparison areas, and a rule content mask of one rule key may be loaded from the memories 1010, 1020, and 1030.

A rule row mask and a rule column mask may be used as described above. When each of the packet matchers 920 and 930 including eight packet sub-matchers processes 256 rule keys, the rule row mask for use in each of the packet sub-matchers $940_1$ to $940_{i+n}$ has 32 (=256/8) bits.

When an input packet is loaded, the packet sub-matcher $940_1$ performs the following operations on the rule keys assigned to the packet sub-matcher $940_1$. For each rule key, a mask operation unit 1070 of the packet sub-matcher $940_1$ generates an expanded 96-bit rule content mask 1040 using 32 bits of the rule content mask memory 1030, and performs a logical operation of masking 96-bit rule content from the rule content memory 1010 with the expanded rule content mask 1040. An area operation unit 1060 compares the values of the comparison areas of the rule keys stored in the rule area memory 1020 with the value of the comparison area of the packet stored in the packet buffer 1080, and then updates the dummy bits of the Packet Content in the packet buffer 1080 with the results of the comparison. Subsequently, a content matcher 1050 performs a logical operation of comparing the rule content with the packet content bit by bit.

The packet stream capture unit 740 converts a packet input or output through the NIC 610 into a data set in an appropriate form for matching operations performed in the packet matching engine 710. The conversion performed by the packet stream capture unit 740 may include extraction of certain data from the packet. The packet stream capture unit 740 provides the extracted data to the FW engine 170. The extracted data may be data related to FW rules. Data that is not related to FW rules is not necessarily required for matching between the packet and the FW rules, and thus may not be provided to the FW engine 170. For example, for a packet of a link layer protocol such as the Ethernet protocol, FW rules may be set in connection with data specified for the link layer protocol, data specified for a network layer protocol, and/or data specified for a transmission layer protocol, or may be set in connection with data specified for an application layer protocol.

As an example, a case in which the packet stream capture unit 740 receives an Ethernet frame packet is assumed. The packet stream capture unit 740 extracts data related to FW rules from an Ethernet frame. For example, information including a source media access control (MAC) address and a destination MAC address in a MAC header and a source IP address, a destination IP address, a packet version, and a protocol in an IP header is extracted from the Ethernet frame. When the Ethernet frame is in accordance with the TCP or the user datagram protocol (UDP), information including a source port and a destination port in a TCP header or a UDP header is extracted. On the other hand, when the Ethernet frame is an Internet control message protocol (ICMP) message, information including a type and a code is extracted.

Figure 11:
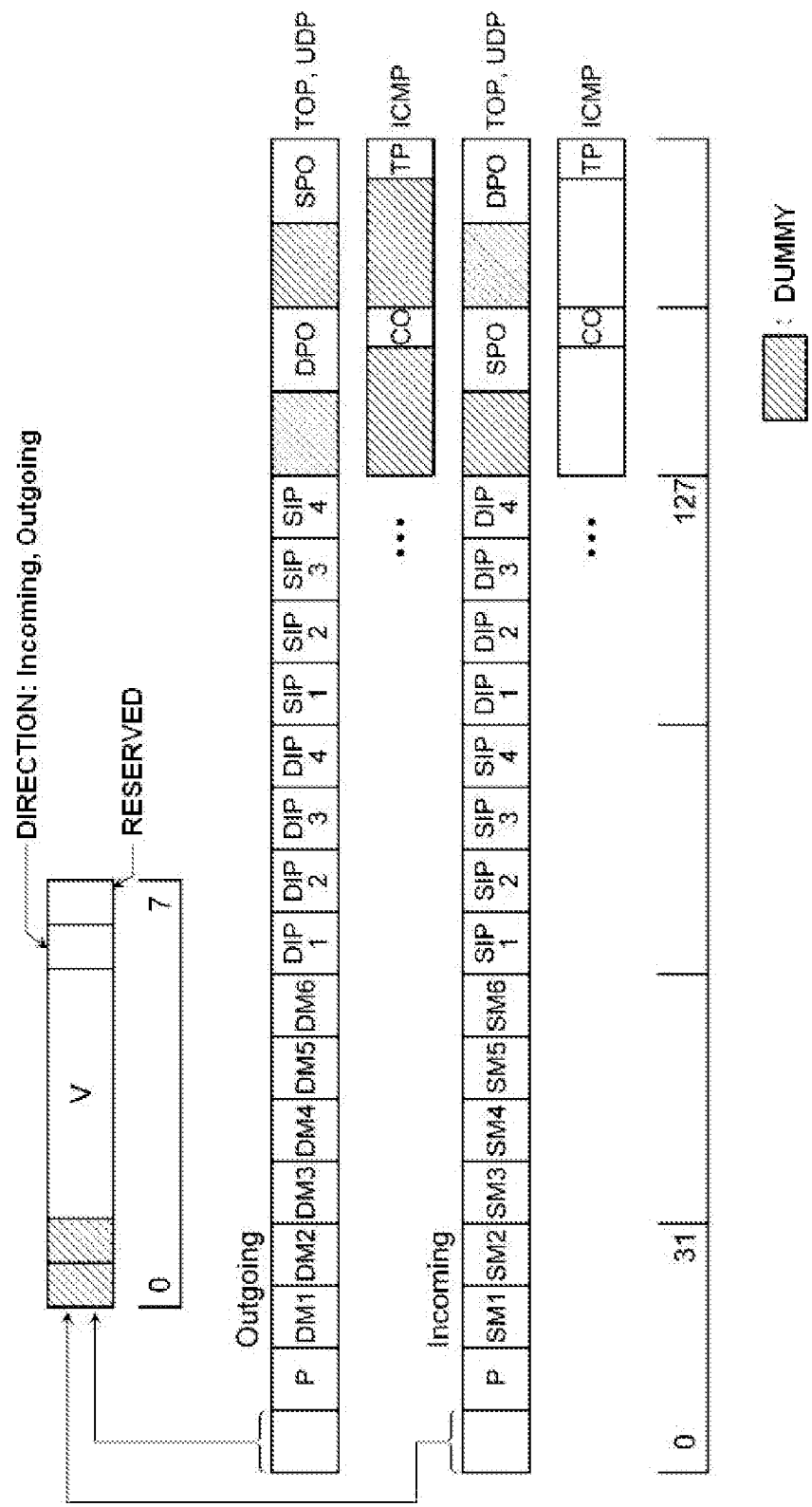
FIG. 11 is a diagram illustrating a process for a packet stream capture unit to convert an Ethernet frame according to an exemplary embodiment of the present disclosure.

With reference to FIG. 11, conversion of an Ethernet frame by the packet stream capture unit 740 will be described. In FIG. 11, the Ethernet frame includes an IPv4 packet.

When the Ethernet frame is an outgoing TCP or UDP packet, the packet stream capture unit 740 reads the Ethernet frame as the uppermost format in FIG. 11. In this format, two dummy bits, a packet version indicated by V, a direction bit indicating whether the Ethernet frame goes outside or comes in from the outside, a reserved bit, a protocol indicated by P, a destination MAC address indicated by DM1 to DM6, a destination IP address indicated by DIP1 to DIP4, and a source IP address indicated by SIP1 to SIP4 are positioned at bits beginning with bit 0, and continuously followed by a destination port indicated by DP0 and a source port indicated by SP0 together with certain dummy bits. When the outgoing Ethernet frame is an ICMP message, the destination port and the source port are replaced by a code indicated by CO and a type indicated by TP, respectively.

An incoming Ethernet frame also has a similar format to that described above. In such a format, two dummy bits, a packet version indicated by V, a direction bit indicating whether the Ethernet frame goes outside or comes in from the outside, a reserved bit, a protocol, a source MAC address indicated by SM1 to SM6, a source IP address, and a destination IP address are positioned, and continuously followed by a source port and a destination port or a code and a type together with certain dummy bits.

Subsequently, the packet stream capture unit 740 provides the data related to FW rules to the packet matching engine 710. For example, the packet stream capture unit 740 generates a 128-bit packet key on the basis of data that has been converted into a certain format as described above, and provides the generated 128-bit packet key to the packet matching engine 710. When the Ethernet frame input to the packet stream capture unit 740 includes an IPv6 packet, the packet stream capture unit 740 may convert the input frame into a 256-bit packet key.

As described above, the packet stream capture unit 740 may rapidly parse a packet. Furthermore, the packet stream capture unit 740 may rapidly parse a packet that is a target of URL filtering (e.g., an HTTP packet) or a file that is a target of content filtering (e.g., a document or image file having a specific keyword/pattern).

For example, when an Ethernet frame received through the NIC 610 includes a TCP packet, the packet stream capture unit 740 converts a packet of an application layer protocol including a URL part (e.g., an HTTP packet or a PPTP packet) into a simplified format appropriate for subsequent matching, such that a URL check can be performed on an application layer protocol such as the HTTP or the PPTP. Since a size of the URL part to be checked is not fixed, the packet stream capture unit 740 hashes the part corresponding to a URL filtering rule and stores the hashed part. For example, in an HTTP packet, the packet stream capture unit 740 finds a method field and a space sp following the method field to check a position of a URL field, and extracts a domain name and a subsequent path part from a URL part. In a similar way, also in a PPTP packet, a length field and a message type field are masked and a magic cookie field is extracted.

Figure 12:
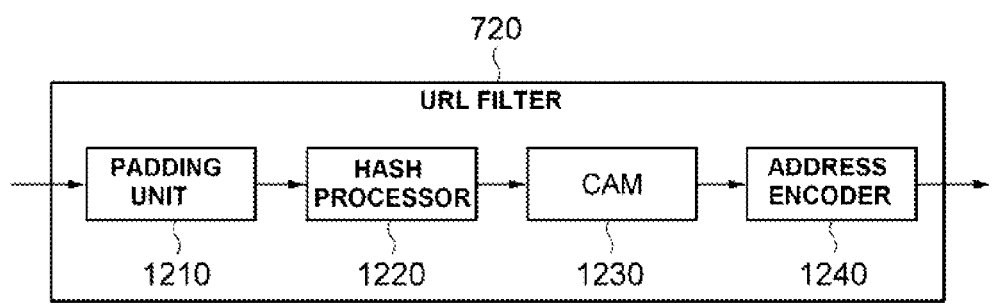
FIG. 12 shows a constitution of a uniform resource locator (URL) filter according to an exemplary embodiment of the present disclosure.

The extracted URL-related part is input to the URL filter 720. FIG. 12 shows a constitution of a URL filter according to an exemplary embodiment of the present disclosure. With reference to FIG. 12, an operation of the exemplary URL filter 720 is described. The input part is hashed by a hash processor 1220 according to an algorithm such as SHA256. For such hashing, a padding unit 1210 adds a padding bit to the part input to the URL filter 720 according to an input block unit of the hash processor 1220, and delivers the input part to the hash processor 1220. An output of the hash processor 1220 is provided to a CAM 1230 of the URL filter 720, and string matching is performed. When the hashed URL-related part matches a URL filtering rule of the CAM 1230, an address is output from the CAM 1230 through an address encoder 1240.

As another example, a packet including a file set to go outside by an application 630 may include a specific keyword (e.g., "confidential") or pattern (e.g., Social Security Number). In this case, the packet stream capture unit 740 may convert the file into an appropriate format for filtering content used in the application layer. A detailed conversion scheme may vary according to a file, a keyword, and/or a pattern.

Subsequently, the content filter 730 may perform content filtering in a similar way to URL filtering operations of the URL filter 720. Content filtering in the application layer prevents the distinction and outflow of content including specific information.

The hardware-based AM system described above can be implemented in various mobile devices, PCs, or embedded devices. On a platform provided by the AM system, an FW solution effectively blocks a malware infection route and allows network packets to be filtered and monitored according to an FW policy, and thus it is easy to fundamentally block access to a malware distribution site or a phishing site and prevent a distributed denial of service (DDoS) attack. In addition, a filtering function provided on the basis of hardware can reduce a response time to packet transmission, and can be performed within an appropriate time even when the number of FW rules increases. Furthermore, even when a variable size of data from packets in accordance with a certain protocol is related to FW rules, matching of packets with FW rules can be rapidly performed on the basis of hardware.

Meanwhile, an exemplary embodiment of the present disclosure may include a computer-readable recording medium including a program for performing the methods described herein on a computer. The computer-readable recording medium may separately include program commands, local data files, local data structures, etc. or include a combination of them. The medium may be specially designed and configured for the present disclosure. Examples of the computer-readable recording medium include magnetic media, such as a hard disk, a floppy disk, and a magnetic tape, optical recording media, such as a CD-ROM and a DVD, magneto-optical media, such as a floptical disk, and hardware devices, such as a ROM, a RAM, and a flash memory, specially configured to store and perform program commands. Examples of the program commands may include high-level language codes executable by a computer using an interpreter, etc. as well as machine language codes made by compilers.

In certain exemplary embodiments, certain operations for providing an FW function are performed at a high speed in a hardware-based FW engine, and other FW operations are implemented on a software level of a platform including the FW engine so that various security solutions can be provided.

In certain exemplary embodiments, a computing device having limited resources can provide improved FW performance.

It will be apparent to those familiar with this field that various modifications can be made to the above-described exemplary embodiments of the present disclosure without departing from the spirit or scope of the present disclosure. Thus, it is intended that the present disclosure covers all such modifications provided they come within the scope of the appended claims and their equivalents.

What is claimed is:

1. An anti-malware (AM) apparatus, comprising:
    a hardware-based firewall (FW) engine, including a packet matching engine configured to perform matching of a packet with a plurality of FW rules, and to generate a matching result; and
    an FW function module configured to determine an action for filtering the packet on the basis of the matching result,
    wherein the packet matching engine includes:
    a plurality of rule keys derived from the plurality of FW rules;
    a packet key converted from the packet; and
    one or more packet matchers configured to compare the packet key with the plurality of rule keys, wherein each of said one or more packet matchers includes a plurality of packet sub-matchers configured to operate in parallel, and further configured to compare a subset of the plurality of rule keys with the packet key.

2. The AM apparatus of claim 1, wherein:
the hardware-based FW engine further includes a packet stream capture unit; and
the packet stream capture unit is configured to extract data, related to the plurality of FW rules, from the packet and to provide the extracted data to the packet matching engine.

3. The AM apparatus of claim 2, wherein the packet stream capture unit extracts the data from the packet so as to include data specific to at least one of a link layer protocol, a network layer protocol, and a transmission layer protocol.

4. The AM apparatus of claim 2, wherein:
the plurality of FW rules further include a uniform resource locator (URL) filtering rule;
the hardware-based FW engine further includes a URL filter;
the packet stream capture unit is further configured to extract a URL portion from the packet and to provide the extracted URL portion to the URL filter; and
the URL filter is configured to perform matching of the URL portion with the URL filtering rule.

5. The AM apparatus of claim 2, wherein:
the plurality of FW rules further include a content filtering rule;
the hardware-based FW engine further includes a content filter;
the packet stream capture unit is further configured to extract at least one of a keyword and a pattern, from the packet, and to provide to the content filter the extracted at least one of the keyword and the pattern; and
the content filter is configured to perform matching of the at least one of the keyword and the pattern with the content filtering rule.

6. The AM apparatus of claim 1, wherein the FW function module is implemented as firmware.

7. The AM apparatus of claim 6, wherein the hardware-based FW engine includes a central processing unit (CPU) and a memory, and wherein the firmware implementing the FW function module is stored in the memory.

8. The AM apparatus of claim 1, wherein the FW function module is implemented as an application, said application being executed by an external CPU in cooperation with the hardware-based FW engine.

9. The AM apparatus of claim 1, wherein the hardware-based FW engine is integrated with a processor, and wherein the processor includes a security execution environment module configured to virtualize the processor into virtualized processors respectively corresponding to a normal mode and a security mode.

10. The AM apparatus of claim 9, wherein a virtualized processor corresponding to the security mode is configured to execute an application received by the AM apparatus.

11. The AM apparatus of claim 9, further comprising a storage device connected to the processor, wherein the security execution environment module virtualizes the storage device into virtualized storage devices respectively corresponding to the normal mode and the security mode.

12. The AM apparatus of claim 11, wherein a virtualized storage device corresponding to the security mode stores the plurality of FW rules.

13. A method of processing a packet in an anti-malware (AM) apparatus, comprising:

performing matching of the packet with a plurality of FW rules using a packet matching engine of a hardware-based firewall (FW) engine;
generating a matching result; and
determining, at an FW function module, an action for filtering the packet on the basis of the matching result,
wherein the performing matching of the packet includes;
deriving a plurality of rule keys from the plurality of FW rules;
converting a packet key from the packet;
operating, in parallel, in each of one or more packet matchers, a plurality of packet sub-matchers; and
comparing, at each of said plurality of packet sub-matchers, the packet key with a subset of the plurality of rule keys.

14. The method of claim 13, further comprising extracting, at a packet stream capture unit of the hardware-based FW engine, data related to the FW rules, from the packet, and providing the extracted data to the packet matching engine.

15. The method of claim 14, wherein the extracting of the data from the packet at the packet stream capture unit is performed so as to include data specific to at least one of a link layer protocol, a network layer protocol, and a transmission layer protocol.

16. The method of claim 14, further comprising:
extracting, at the packet stream capture unit, a uniform resource locator (URL) portion from the packet;
providing the extracted URL portion to a URL filter of the hardware-based FW engine; and
matching, at the URL filter, the URL portion with a URL filtering rule of the plurality of FW rules.

17. The method of claim 14, further comprising:
extracting, at the packet stream capture unit, at least one of a keyword and a pattern from the packet;
providing the at least one of the keyword and the pattern to a content filter of the hardware-based FW engine; and
matching, at the content filter, the at least one of the keyword and the pattern with a content filtering rule of the plurality of FW rules.

18. The method of claim 13, wherein the FW function module implemented as firmware.

19. The method of claim 18, wherein the hardware-based FW engine includes a central processing unit (CPU) and a memory, and wherein the firmware implementing the FW function module is stored in the memory.

20. The method of claim 13, wherein the FW function module implemented as an application, said application being executed by an external CPU in cooperation with the hardware-based FW engine.

21. The method of claim 13, wherein the hardware-based FW engine is integrated with a processor, and the processor includes a security execution environment module to virtualize the processor into virtualized processors respectively corresponding to a normal mode and a security mode.

22. The method of claim 21, wherein a virtualized processor corresponding to the security mode executes an application using the AM apparatus.

23. The method of claim 21, further comprising virtualizing, at the security execution environment module, a storage device connected to the processor into virtualized storage devices respectively corresponding to the normal mode and the security mode.

24. The method of claim 23, wherein the plurality of FW rules are stored in the virtualized storage device corresponding to the security mode.

25. A computing device, comprising:
a CPU core, and
an anti-malware (AM) apparatus configured to provide a security platform on which a firewall (FW) software application is executable,
wherein the AM apparatus includes:
a hardware-based FW engine including a packet matching engine configured to perform matching of a packet with a plurality of FW rules and to generate a matching result; and
an FW function module configured to determine an action for filtering the packet on the basis of the matching result,
wherein the packet matching engine includes:
a plurality of rule keys derived from the plurality of FW rules;
a packet key converted from the packet; and
one or more packet matchers configured to compare the packet key with the plurality of rule keys,
wherein each of said one or more packet matchers includes a plurality of packet sub-matchers configured to operate in parallel, and further configured to compare a subset of the plurality of rule keys with the packet key.

\* \* \* \* \*